United States Patent [19]

Miller

[11] 4,433,373
[45] Feb. 21, 1984

[54] APPARATUS FOR PROGRAMMING NUMERICALLY PATH CONTROLLED PROCESSING DEVICES

[75] Inventor: Walter Miller, Traunstein, Fed. Rep. of Germany

[73] Assignee: Dr. Johannes Heidenhain GmbH, Traunreut, Fed. Rep. of Germany

[21] Appl. No.: 287,098

[22] Filed: Jul. 27, 1981

[30] Foreign Application Priority Data

Jul. 29, 1980 [DE] Fed. Rep. of Germany ....... 3028708

[51] Int. Cl.³ .............................................. G06F 15/46
[52] U.S. Cl. .................................. 364/171; 318/568; 364/191; 364/474
[58] Field of Search .............................. 364/191-193, 364/167-171, 474, 475, 200 MS File, 900 MS File; 318/568, 567, 569, 570

[56] References Cited

U.S. PATENT DOCUMENTS 3,939,453 2/1976 Schroeder ...................... 364/900 X
4,010,356 3/1977 Evans et al. ..................... 364/191 X
4,152,765 5/1979 Weber ............................. 364/191 X
4,315,315 2/1982 Kossiakoff ....................... 364/191 X

FOREIGN PATENT DOCUMENTS 2054909 2/1981 United Kingdom ................ 364/171

OTHER PUBLICATIONS

"Positioning Control TNC 131"–Heidenhain (G.B.) Ltd.-Documented No. 20815921e 40 2/80 H.

Primary Examiner—Joseph F. Ruggiero
Attorney, Agent, or Firm—Willian, Brinks, Olds, Hofer, Gilson & Lione Ltd.

[57] ABSTRACT

A programmable, numerically path controlled processing device of the type which includes a controller, a display unit coupled to the controller, and a keyboard input unit, also coupled to the controller, is programmed selectively to display two alternate sets of dialog texts to structure the programming of the control unit. One set of dialog texts is relatively lengthy and complex and is suitable for general purpose path programming. The second set of dialog texts, on the other hand, is relatively simple and short and contains only dialog texts suitable for programming the processing device in the axially parallel, interval programming mode. The interval programming mode is simpler and more limited than the general purpose path programming mode, and therefore, by calling up the second set rather than the first set of dialog texts, an operator can program the processing device in the interval programming mode in a shorter period of time and in a more direct manner.

10 Claims, 1 Drawing Figure

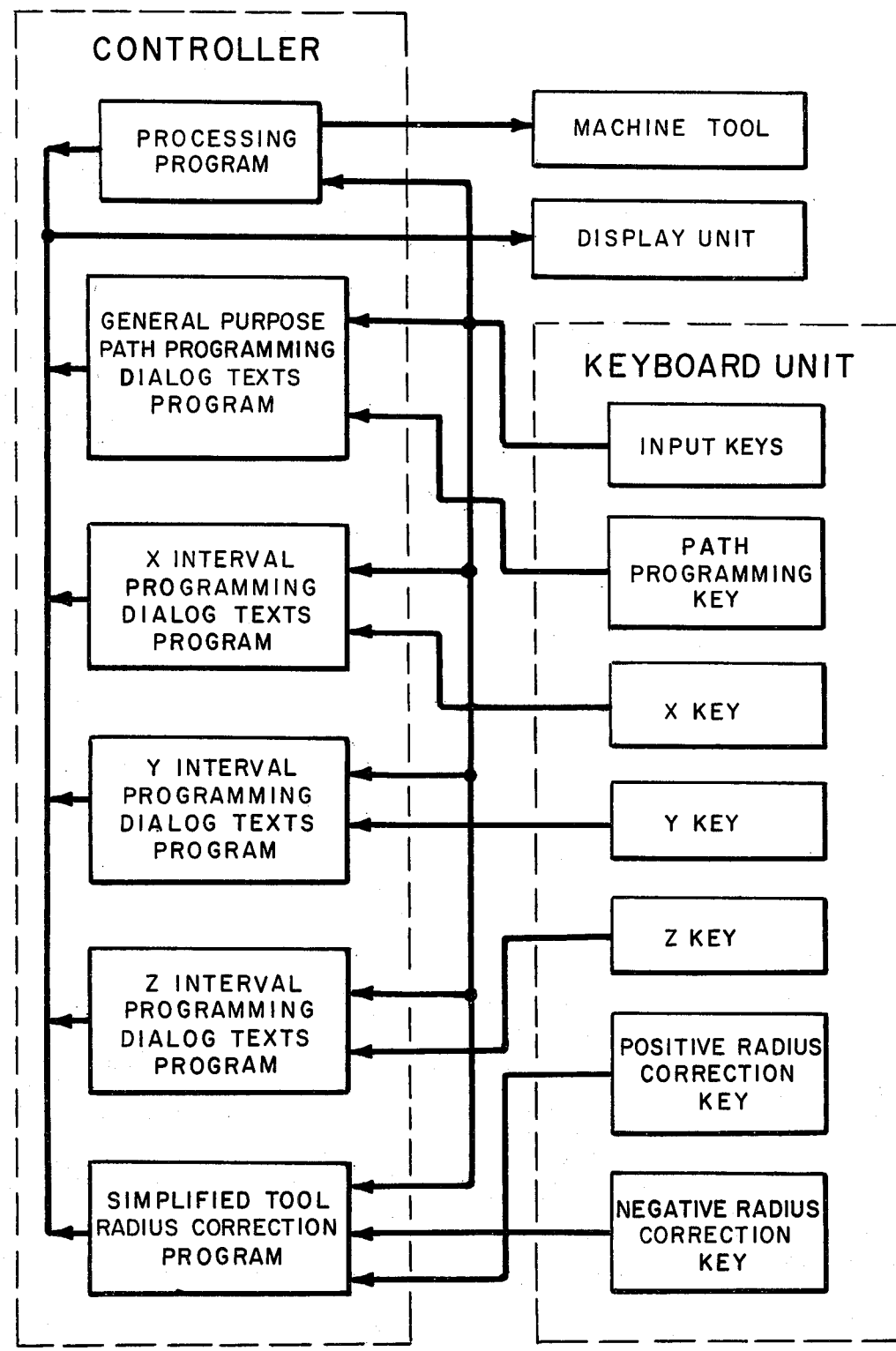

APPARATUS FOR PROGRAMMING NUMERICALLY PATH CONTROLLED PROCESSING DEVICES

BACKGROUND OF THE INVENTION

This invention relates generally to apparatus and methods related to the programming of numerically path controlled processing devices, and particularly to the programming of such devices of the type which include means for displaying dialog texts on associated display units.

It is known to the art to provide programmable, numerically path controlled processing devices of the type which include a programmable controller; a display unit coupled to the controller; means, included in the controller, for displaying on the display unit a set of dialog texts suitable for path programming; and a keyboard input unit comprising input key means for the entry of digital programming data to program the controller. In such numerically path controlled processing devices, the content of the control program is much more complex than is the control program for simpler, numerical interval controls. For this reason, the dialog texts used in conjunction with numerically path controlled processing devices generally take on a much greater scope and have a much greater length than do dialog texts suitable only for axially parallel interval programming. Thus, the time expenditure needed either to set up a program or to modify a program is correspondingly high for numerically path controlled processing devices, as contrasted with interval controlled processing devices, even when these devices are used in a purely interval programming mode.

SUMMARY OF THE INVENTION

The present invention is directed to improved means and processes for programming path controlled processing devices, which largely overcome the aforementioned disadvantages of the prior art and simplify the use and operation of path controlled processing devices. As used herein, the term "processing device" is used in its broad sense to encompass both machine tool, measuring, and related equipment.

According to this invention, a numerically path controlled processing device of the type described above further comprises means, included in the controller unit, for displaying a second set of abbreviated dialog texts on the display unit. This second set of dialog texts is simpler than the dialog texts suitable for general purpose numerically path controlled programming, and the second set of dialog texts is particularly adapted for axially parallel interval programming. In addition, means are provided for selectively activating dialog texts in either the more complex, general purpose set of dialog texts or alternately in the simpler, specialized set of dialog texts suitable for axial parallel interval programming.

One important advantage achieved with this invention is that, particularly in the case of interval programming, considerable time can be saved in either setting up or modifying programs. In this way, operator time as well as down time for the processing device can be reduced. Furthermore, this invention simplifies interval programming and makes it more convenient. Additional advantageous features of this invention are set forth in the dependent claims.

The invention itself, together with further objects and attendant advantages, can best be understood by reference to the following detailed description taken in connection with the accompanying drawing.

BRIEF DESCRIPTION OF THE DRAWING

The FIGURE is a simplified block diagram of the presently preferred embodiment of this invention.

DETAILED DESCRIPTION OF THE PRESENTLY PREFERRED EMBODIMENT

As shown in the drawing, one presently preferred embodiment of this invention includes a numerically path controlled machine tool of the type which includes a controller which provides dialog between the operator and the controller. This embodiment includes a display unit for the visual representation of program instructions and/or dialog texts, as well as a keyboard input unit having a plurality of input keys by means of which the operator can input numerical or alphanumerical data to the control unit. The program instructions for programming the control unit for a particular path are called upon by means of instruction commencement keys successively and after the display of dialog texts on the display unit. The content of the control program (that is, the program instructions) are, in comparison to simple numerical interval control, highly complex. For this reason, the dialog texts suited for path control programming are also relatively complex and lengthy.

In order to make it possible to use such a numerical path control device also as a simple interval control device, the illustrated embodiment provides, in addition to the dialog texts suited for path programming, an additional set of abbreviated and thus simpler dialog texts suitable for axially parallel interval programming. Preferably, this second set of dialog texts can be called up by the operator by means of keys provided on the alpha-numeric keyboard specifically for this purpose.

By way of example, when the machine tool described above operates in the generalized path program mode, it successively interrogates the operator by means of suitable dialog texts to prompt operator entry of the desired position values for the X, Y and Z axes as well as the desired value for the advance F and, if need be, further additional functions H. After the operator has answered these dialog inquiries (in which the controller may make suggestions as to proposed values for the data to be fed in), the display unit will display a finished program line. For example, such a program line may appear as follows (where A represents the absolute mass):

A X 100 Y 50 Z 10 F 1000 H 01010.

This approach is well suited for general purpose path programming. However, if the operator wishes to program exclusively in axially parallel intervals, this approach is unnecessarily complex and time consuming. The present invention provides a separate set of dialog texts suited particularly for such axially parallel interval programming.

For example, the preferred embodiment of the drawings includes an X-key, a Y-key and a Z-key, each of which calls up a shortened dialog suited for interval programming parallel to the respective axis. Thus, by depressing the X-key, the operator can call up a shortened dialog for interval programming parallel to the X-axis, including appropriate inquiries and suggested values for the data to be fed in. After the operator has answered these dialog inquiries, the display unit will display a finished program line, which may, for example, appear as follows (where A represents the absolute mass):

A X 100 F 1000 H 01010.

The Y-key and the Z-key function in a corresponding manner for the Y and Z axes, respectively.

By using the X, Y and Z keys, the operator can substantially reduce the length of the program line, and therefore the length of the dialog texts, thereby speeding programming in the axially parallel interval mode.

In a further development of this invention, in the axially parallel interval program there is also provided a specifically adapted, correspondingly simplified, tool radius correction program, which can be called up by the operator by means of keys provided specifically for that purpose. The operator can use these keys to establish either that the travel interval is to be shortened by the appropriate tool radius correction value (subtraction of the correction value) or alternately that the travel interval is to be lengthened by the respective radius correction value (addition of the correction value). Of course, it is either the shortened or the lengthened travel interval, as appropriate, which then determines the particular goal position.

The present invention is preferably used in conjunction with control devices of the type which display dialog texts to make proposals to the operator with regard to the numerical and/or alpha-numerical data to be entered in either setting up or the modifying programming instructions. Once the entry or modification of a program has been begun, the individual program instructions are completely established in the sequence determined by the dialog text only after the operator has answered appropriately the respective dialog texts. For example, this answering by the operator can take the form of consent to or modification of data proposed in the dialog text. If so, the data proposed in the dialog text can be the data last used in the proceeding processing runs. In this way the operator is spared the repeated input of the same data.

Of course, it should be understood that various changes and modifications to the preferred embodiment described above will be apparent to those skilled in the art. The foregoing detailed description is intended to illustrate the presently preferred embodiment of the invention, and is not intended to be construed in a limiting fashion. It is the following claims, including all equivalents, which are intended to define the scope of this invention.

I claim:

1. In a programmable, numerically path controlled processing device of the type comprising a multiple axis controller for controlling the processing device along at least two axes; a display unit coupled to the controller; means, included in the controller, for displaying on the display unit a first set of dialog texts suitable for multiple axis path programming; and a keyboard input unit comprising input key means for the entry of digital programming data to the controller, the improvement comprising:

means, included in the controller, for displaying on the display unit a second, abbreviated set of dialog texts, simpler than the first set of dialog texts, each of said second set of dialog texts suitable for single axis, axially parallel interval programming of paths parallel to a respective one of the at least two axes, but unsuitable for multiple axis path programming; and means for selectively activating a selected one of the means for displaying the first set of dialog texts and the means for displaying the second set of dialog texts.

2. The invention of claim 1 wherein the activating means comprises selected ones of the input key means.

3. The invention of claim 1 further comprising means for providing a simplified tool radius correction suitable for tool radius correction in axially parallel interval programming.

4. The invention of claim 3 further comprising means for selectively activating the means for providing the simplified tool radius correction.

5. The invention of claim 4 wherein the tool radius activating means comprises:

means, responsive to a first selected one of the input key means, for selectively shortening a travel interval by a radius correction value to determine a goal position; and means, responsive to a second one of the input key means, for selectively lengthening the travel interval by the radius correction value to determine the goal position.

6. In a programmable, numerically path controlled processing device of the type comprising a three axis controller for controlling movement of the processing device along an X axis, a Y axis, and a Z axis; a display unit coupled to the controller; means, included in the controller, for displaying on the display unit a first set of dialog texts suitable for three axis path programming along the X, Y and Z axes, and a keyboard input unit comprising input key means for the entry of digital programming data to the controller, the improvement comprising:

means, included in the controller, for displaying on the display unit a second, abbreviated set of dialog texts, simpler than the first set of dialog texts, said second set of dialog texts suitable only for path programming parallel to the X axis and not for three axis path programming;

means, included in the controller, for displaying on the display unit a third, abbreviated set of dialog texts, simpler than the first set of dialog texts, said third set of dialog texts suitable only for path programming parallel to the Y axis and not for three axis path programming;

means, included in the controller, for displaying on the display unit a fourth, abbreviated set of dialog texts, simpler than the first set of dialog texts, said fourth set of dialog texts suitable only for path programming parallel to the Z axis and not for three axis path programming; and means for selectively activating a selected one of the means for displaying the first, second, third and fourth sets of dialog texts in order to cause the selected set of dialog texts to be displayed.

7. The invention of claim 6 wherein the activating means comprises selected ones of the input key means.

8. The invention of claim 6 further comprising means for providing a simplified tool radius correction suitable for tool radius correction in path programming parallel to a selected one of the three axes.

9. The invention of claim 8 further comprising means for selectively activating the means for providing the simplified tool radius correction.

10. The invention of claim 9 wherein the tool radius activating means comprises:

means, responsive to a first selected one of the input key means, for selectively shortening a travel interval by a radius correction value to determine a goal position; and means, responsive to a second one of the input key means, for selectively lengthening the travel interval by the radius correction value to determine the goal position.

* * * * *